United States Patent
Pepeljugoski et al.

(10) Patent No.: US 8,718,492 B2
(45) Date of Patent: May 6, 2014

(54) ADAPTIVE POWER EFFICIENT RECEIVER ARCHITECTURE

(75) Inventors: Petar K. Pepeljugoski, Tarrytown, NY (US); Alexander V. Rylyakov, Mount Kisco, NY (US); Clint L. Schow, Ossining, NY (US); Mehmet Soyuer, Stamford, CT (US)

(73) Assignee: International Business Machines Corporation, Armonk, NY (US)

( * ) Notice: Subject to any disclaimer, the term of this patent is extended or adjusted under 35 U.S.C. 154(b) by 549 days.

(21) Appl. No.: 12/971,250

(22) Filed: Dec. 17, 2010

(65) Prior Publication Data

US 2012/0155864 A1    Jun. 21, 2012

(51) Int. Cl.
*H04B 10/06* (2011.01)

(52) U.S. Cl.
USPC .......................................... 398/209; 398/208

(58) Field of Classification Search
USPC .......... 398/209, 210, 208, 206, 202; 359/337, 359/337.1, 337.11, 337.13
See application file for complete search history.

(56) References Cited

U.S. PATENT DOCUMENTS

| | | | |
|---|---|---|---|
| 6,233,091 B1 | 5/2001 | Kosaka et al. | |
| 6,262,835 B1 | 7/2001 | Kosaka et al. | |
| 6,917,467 B2 | 7/2005 | Howell et al. | |
| 7,061,668 B2 | 6/2006 | Maurer et al. | |
| 7,079,310 B2 | 7/2006 | Chen | |
| 7,603,043 B2 * | 10/2009 | Aoki et al. | 398/202 |
| 2010/0092186 A1 * | 4/2010 | Takahara | 398/208 |

FOREIGN PATENT DOCUMENTS

| | | |
|---|---|---|
| CN | 1581735 A | 2/2005 |
| CN | 101621283 A | 1/2010 |
| CN | 101861698 A | 10/2010 |
| JP | 2278906 | 11/1990 |
| JP | 10341056 | 12/1998 |

* cited by examiner

*Primary Examiner* — M. R. Sedighian
(74) *Attorney, Agent, or Firm* — Tutunjian & Bitetto, P.C.; Anne V. Dougherty (57) ABSTRACT

Systems and methods for processing an optical signal are disclosed. The optical signal is converted to a voltage signal and the voltage signal is amplified. In addition, a signal strength and/or a signal quality parameter is monitored and an indication of the signal strength and/or a signal quality parameter is generated. Further, a gain and/or an operating bandwidth on the conversion or the amplification can be adjusted based on the indication to reduce power consumption of an optical receiver.

25 Claims, 4 Drawing Sheets

ADAPTIVE POWER EFFICIENT RECEIVER ARCHITECTURE

BACKGROUND

1. Technical Field

The present application relates to optical receivers and more particularly to power consumption in optical receivers.

2. Description of the Related Art

In typical optical receiver applications, input optical power varies from 6-20 dB, with the lower range more prevalent in multimode fiber links and the higher range more prevalent in single mode fibers. To accommodate such a large dynamic range, receivers are designed to supply a sufficient gain to produce a strong digital output for the lowest specified optical input power. In addition, the maintenance of output signal linearity is also an important concern. Thus, to preserve output signal linearity, optical receivers utilize a variable gain amplifier or automatic gain control, which is independent of the input signal strength.

SUMMARY

One embodiment is directed to a method for processing an optical signal. In accordance with the method, the optical signal is converted to a voltage signal and the voltage signal is amplified. In addition, a signal strength and/or a signal quality parameter is monitored and an indication of the signal strength and/or a signal quality parameter is generated. Further, a gain and/or an operating bandwidth on the conversion and/or the amplification is adjusted based on the indication to reduce power consumption of an optical receiver.

Another embodiment is directed to a computer readable storage medium including a computer readable program. The computer readable program, when executed on a computer, causes the computer to monitor, and generate an indication of, an optical signal strength and/or an optical signal quality parameter. The computer readable program also causes the computer to adjust a gain and/or an operating bandwidth on a trans-impedance amplifier and/or a limiting amplifier based on the indication to reduce power consumption of an optical receiver.

An alternative embodiment is directed to a receiver system for processing an optical signal. The receiver system includes a conversion module that is configured to convert the optical signal to a voltage signal. In addition, the receiver system also includes an amplifier that is configured to amplify the voltage signal such that the voltage signal is within an operable range of a digital logic component. Moreover, the receiver system includes a monitor that is configured to monitor a signal strength and/or a signal quality parameter. The monitor is further configured to generate an indication of the signal strength and/or the signal quality parameter. The receiver system further includes a controller that is configured to adjust a gain and/or an operating bandwidth on the conversion module and/or the amplifier based on the indication to reduce power consumption of the receiver system.

Another embodiment is directed to a receiver device for processing an optical signal. The receiver device includes a photo diode that is configured to convert the optical signal to a current signal. In addition, the receiver device also includes a trans-impedance amplifier that is operatively coupled to the photo diode and is configured to convert the current signal to a voltage signal. Moreover, the receiver device includes a limiting amplifier that is operatively coupled to the trans-impedance amplifier and is configured to amplify the voltage signal such that the voltage signal is within an operable range of a digital logic component. Further, the receiver device also includes a monitor that is configured to monitor, and generate an indication of, a signal strength and/or a signal quality parameter. Additionally, the receiver device includes a controller that is configured to adjust a gain and/or an operating bandwidth on at least one of the trans-impedance amplifier or the limiting amplifier based on the indication to reduce power consumption of the receiver device.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

One problem associated with typical optical receiver applications is that, in certain situations in which the input signal is strong, more power than necessary is dissipated in the receiver. For example, as noted above, such optical receivers apply a relatively large gain to ensure that a large dynamic range of input optical power is accommodated. In addition, the receivers also employ a variable gain amplifier or automatic gain control to maintain output signal linearity. Because the variable gain amplifier is designed to adjust the gain according to output signal linearity, the gain is not dependent on input strength. As a result, when a strong optical input signal is received, these receivers nonetheless apply a relatively large gain, even though a lower gain would be sufficient in meeting system specifications for the output signal. As such, the optical receivers consume more power than necessary to properly process the input signals.

However, in certain situations, power efficiency can be improved due to the characteristics of the environment in which the signal is transmitted. For example, when an optical signal is transmitted over a distance of 100 meters or less over, for example, Optical Multimode 3 (OM3) fiber, signal linearity is negligibly affected. Thus, in these types of situations, control logic can adaptively adjust the gain to optimize power consumption at the receiver without impairing signal linearity. In accordance with one or more embodiments, the receiver can tailor gain adjustment exclusively for power consumption minimization, which is possible due to the short length (e.g., less than 100 m) and high signal integrity of optical interconnects in these types of systems. Because signal linearity is not a concern, embodiments of the present principles utilize circuit designs that are less complex and consume less power than known variable gain amplifiers and known automatic gain amplifiers.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The circuit as described herein may be part of a design for an integrated circuit chip. The chip design may be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer may transmit the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The method as described herein may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Figure 1:
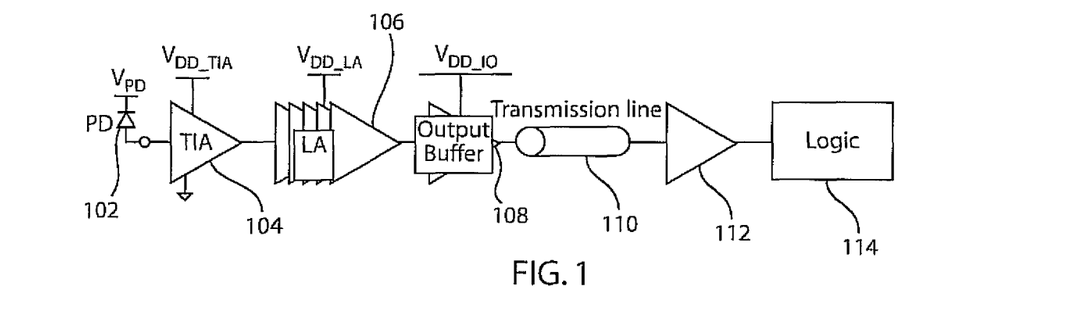
FIG. 1 is a block/flow diagram of a power-hungry, non-adaptive optical receiver circuit/system.

Referring now to the drawings in which like numerals represent the same or similar elements and initially to FIG. 1, a power hungry non-adaptive optical receiver circuit/system 100 is illustrated. The receiver 100 may include a photo diode (PD) 102, powered by a voltage of $V_{PD}$, that may receive an optical signal and convert the optical signal to an electrical current. In turn, a trans-impedance amplifier (TIA) 104, powered by a voltage of $V_{DD\_TIA}$ and operatively coupled to the photo diode 102, may convert the electrical current to a voltage signal to which one or more limiting amplifiers (LA) 106, powered by a voltage of $V_{DD\_LA}$, can apply a gain. An output buffer 108, powered by a voltage of $V_{DD\_IO}$ and operatively coupled to the LA(s) 106, may receive the amplified signal and may output the signal along a controlled-impedance interconnect or transmission line 110 to an electrical receiver 112. The signal can be provided to a logic circuit 114 operatively coupled to the electrical receiver 112, as illustrated in FIG. 1.

Here, in optical receiver 100, a significant portion of the optical receiver power dissipation occurs in the post amplifier (PA) components, denoted by the components that process the output of the TIA for provision to the logic component 114. The function of the PA is to take the output signal from the TIA, which can be as low as a few mV, and bring it to a full digital logic level (~300 mV). The output of the TIA here scales proportionally to the input signal. In a situation in which the optical input power is high, the PA is redundant and gain becomes excessive, leading to wasted power consumption, as discussed above.

In accordance with aspects of the present principles, adaptively controlling the gain and/or bandwidth of certain elements in the PA as a function of the input optical power can achieve power savings in either single channel or multi-channel architectures. As discussed above, an optical receiver can apply such an adaptive adjustment of the gain in an environment in which the distance between a transmitter and the optical receiver is relatively short, for example, less than 100 m, and the optical interconnection between the transmitter and receiver is of a high signal integrity, such as OM3 fiber links. In these types of scenarios, signal power levels are relatively high and signal linearity is negligibly affected. Moreover, in these environments, in which the optical input signal is strong, the speed performance of the PA can also be traded for power dissipation. In other words, the receiver can reduce the operating range of voltages (bandwidth) of the PA to achieve power savings. As discussed further herein below, control logic modules may reduce the gain and/or bandwidth of the PA to save power in response to a strong optical input signal. Further, the control logic modules may set the gain and/or bandwidth of the PA to a high or maximum level to provide high sensitivity.

Figure 2:
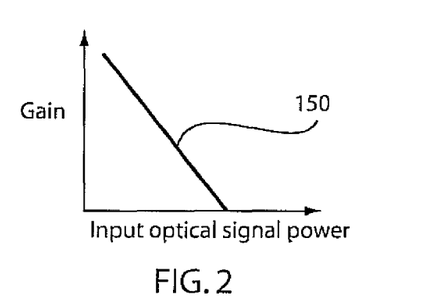
FIG. 2 is a graph detailing gain/bandwidth applied on a limiting amplifier and/or a trans-impedance amplifier by control logic embodiment based on input optical signal strength and/or an input optical signal quality parameter.
Figure 3:
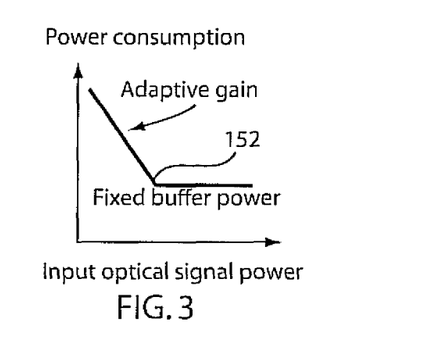
FIG. 3 is a graph detailing the power consumption of an optical receiver embodiment based on input optical signal strength and/or an input optical signal quality parameter.
Figure 4:
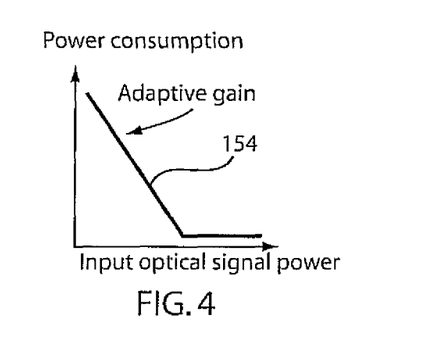
FIG. 4 is a graph detailing the power consumption of an alternative optical receiver embodiment based on input optical signal strength and/or an input optical signal quality parameter.

In particular, the control logic can manage the power consumed by the PA based on the input optical power as depicted graphically in FIGS. 2-4. Plot 150 of FIG. 2 illustrates gains that the control logic may apply to the LA(s) 106 based on the input optical signal power. The control logic can alternatively or additionally adjust the bandwidth in the same manner in which it may adjust the gain based on the input power signal. In other words, the control logic may lower the bandwidth when the signal is strong and may raise the bandwidth in response to detecting a weak signal. The power consumption of the optical receiver for different input optical signal powers is shown in FIGS. 3 and 4. For example, when the control logic applies the gain and/or bandwidth in accordance with Plot 150, the power consumption of the optical receiver is as depicted in Plot 152 of FIG. 3 when a buffer power is fixed and is as depicted in Plot 154 of FIG. 4 in other scenarios. For example, plot 154 can correspond to an optical receiver in which integrated photonics are employed, where the transmission line 110 and the electrical receiver 112 are omitted. Power savings are even more substantial in this scenario, as there is no fixed power consumption for 50-ohm buffers, for example. As shown in Plots 152 and 154, in contrast to typical optical receivers, the power consumption is significantly reduced when the input optical signal power is high.

It should be noted that, as oppose to adjusting the gain and/or bandwidth based on the input optical signal power, the control logic can also adjust the gain and/or bandwidth based on a signal quality parameter. For example, the signal quality parameter can be a signal quality, a bit error rate, a packet integrity, an eye opening parameter or a combination of such parameters. Here, the control logic can adjust the gain and/or bandwidth with respect to the signal quality parameter in the same manner in which it adjusts the gain and/or the bandwidth with respect to the input optical signal strength. For example, the abscissa axis of plot 150 in FIG. 2 can be the signal quality parameter. Moreover, the control logic can adjust the gain and/or the bandwidth based on a combination of the input optical signal strength and the signal quality parameter.

In addition, it should also be understood that, although the control logic has been described as adjusting the gain and/or bandwidth of the LA(s) in accordance with signal strength and/or signal quality parameter, embodiments of the control logic can adjust the gain and/or bandwidth of the TIA in accordance with signal strength and/or signal quality parameter in the same manner. For example, the gain referred to in Plot 150 can alternatively or additionally be applied to the TIA with the same or similar effects on power consumption illustrated in plots 152-154.

Figure 5:
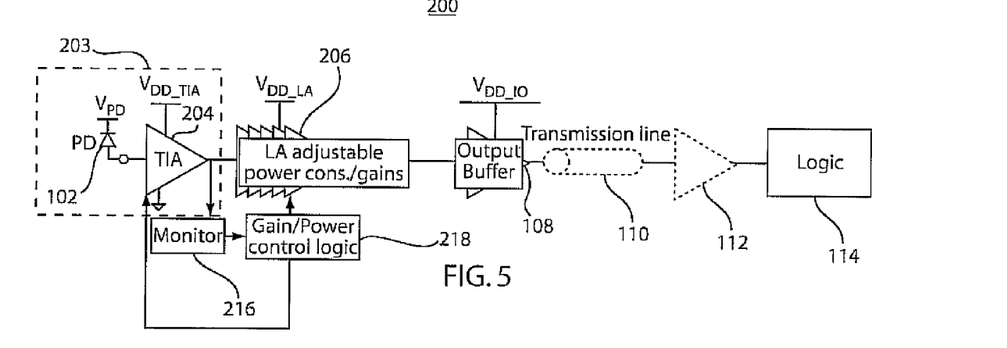
FIG. 5 is a block/flow diagram of an exemplary optical receiver circuit/system embodiment.

Referring now to FIG. 5 with continuing reference to FIG. 1, an exemplary optical receiver circuit/system embodiment 200 is illustrated. It should be understood that the circuit/system 200 may be implemented in silicon (Si) Complementary metal-oxide-semiconductor (CMOS) circuits, silicon-germanium (SiGe) circuits, bipolar circuits, gallium arsenide (GaAs) circuits, Indium Phosphide (InP) circuits, Gallium nitride (GaN) circuits or other semiconductor technologies. Further, the circuit/system 200 may be implemented in a fully integrated or hybrid integrated transceiver plus logic chip, which includes some or all optical components.

The circuit/system 200 can include the same elements described above with regard to circuit/system 100 except that the TIA 204 and/or the LA(s) 206 can operate under the direction of a control logic module 218 with the aid of a monitor 216. For example, the control logic 218 can adjust the gain and/or the bandwidth of the LA(s) 206 and/or the TIA 204 as discussed above. For example, the control logic 218 can adjust the gain and/or the bandwidth of the LA(s) 206 and/or the TIA 204 to be low when the input optical signal power and/or a signal quality parameter is high and can adjust the gain and/or the bandwidth of the LA(s) 206 and/or the TIA 204 to be high when the input optical signal power and/or the signal quality parameter is low. The monitor 216 can be configured to monitor the input optical signal strength and/or the signal quality parameter at the interconnect between the TIA 204 and the LA(s) 206 by measuring the voltage signal at the input of the LA(s). The monitor 216 may also be configured to monitor the input optical signal strength and/or the signal quality parameter at the interconnect between the PD 102 and TIA 204 by measuring the current signal at the input of the TIA 204. When the monitor 216 measures signal strength, the output of the monitor 216 can be proportional to the optical modulation amplitude at the input of the receiver. In addition, the control logic 218 can adjust the gain and/or the bandwidth based on a measure or indication of the input optical signal power and/or the signal quality parameter provided by the monitor 216, as discussed above. It should be noted that the transmission line 110 and the electrical receiver 112 are optional components and can correspond to a circuit described above with respect to plot 154 of FIG. 4. In other words, the output of the PA is directly connected to a logic circuit.

Figure 6:
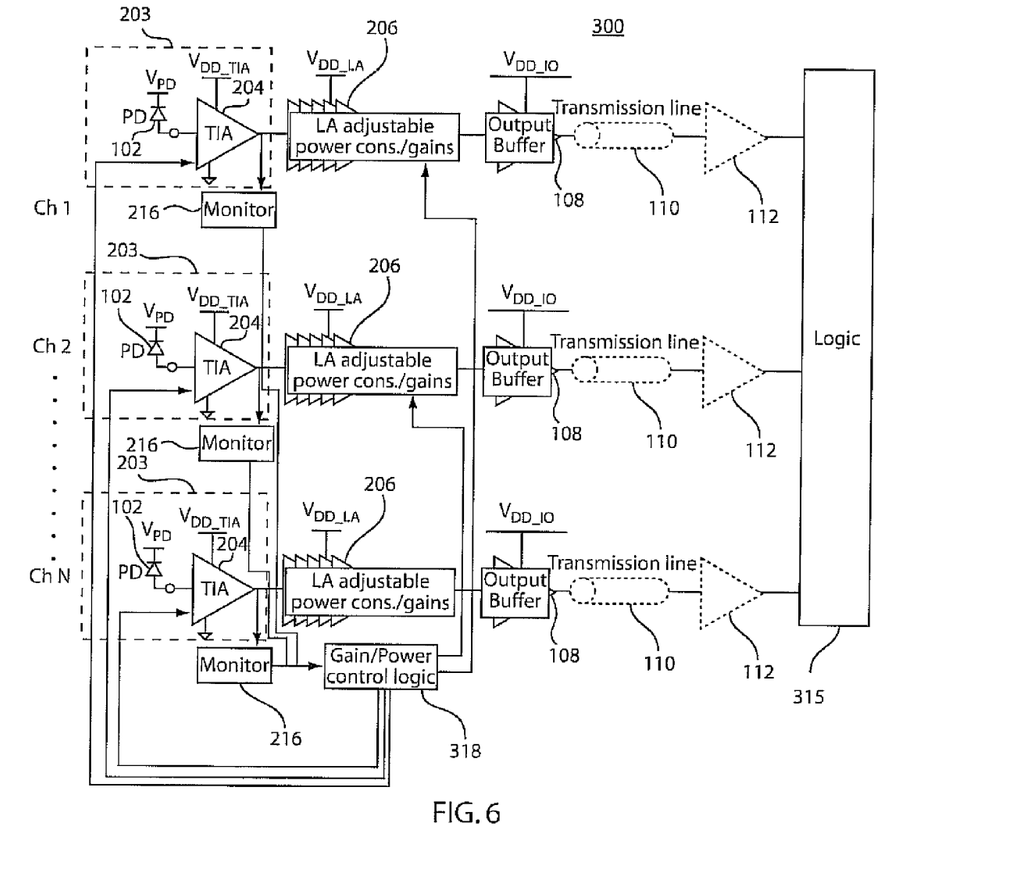
FIG. 6 is a block/flow diagram of an alternative exemplary optical receiver circuit/system embodiment.

With reference now to FIG. 6, with continuing reference to FIGS. 1-5, another exemplary optical receiver circuit/system embodiment 300 is illustrated. As shown in FIG. 6, the receiver 300 employs parallel multi-channel optical buses, where each optical channel 1-N has a dedicated set of processing components. Here, each set of processing components has the same components and operates in the same manner as circuit/system embodiment 200, except that the receiver 300 employs a common logic circuit 315 for each set of processing components and the control logic module 318 adjusts the gain and/or the bandwidth of the LA(s) 206 and/or the TIA 204 in each set of processing components as described above. For example, the control logic 318 can adjust the gain and/or bandwidth in each set of processing components based on a measure or indication of the input optical signal power and/or the signal quality parameter provided by a corresponding monitor 216 for the set of processing components, as described above. Here, a central controller 318 can periodically sample the signal strength and/or the signal quality parameter, at the monitors 216, of individual channels in a large parallel data bus. Moreover, the central controller 318 can adjust the power consumption of each channel individually or multiple channels together to meet minimum system performance requirements.

Similar to the circuit/system 200, any one or more of the transmission lines 110 and any one or more of the electrical receivers 112 can be omitted so that a corresponding output buffer 108 is directly connected to the logic circuit 315. Of course, the optical receiver circuit/system 300 can alternatively be configured so that one or more sets of processing components for an optical channel includes its own corresponding control logic and/or logic circuit that is independent of control logics and/or logic circuits of other sets of processing components.

It should be noted that the control logic 218 and/or the control logic 318 can be a part of a service processor or can be integrated in an application specific integrated circuit (IC). Alternatively, the control logic 218 and/or the control logic 318 can be monolithically integrated in the transceiver chip.

Figure 7:
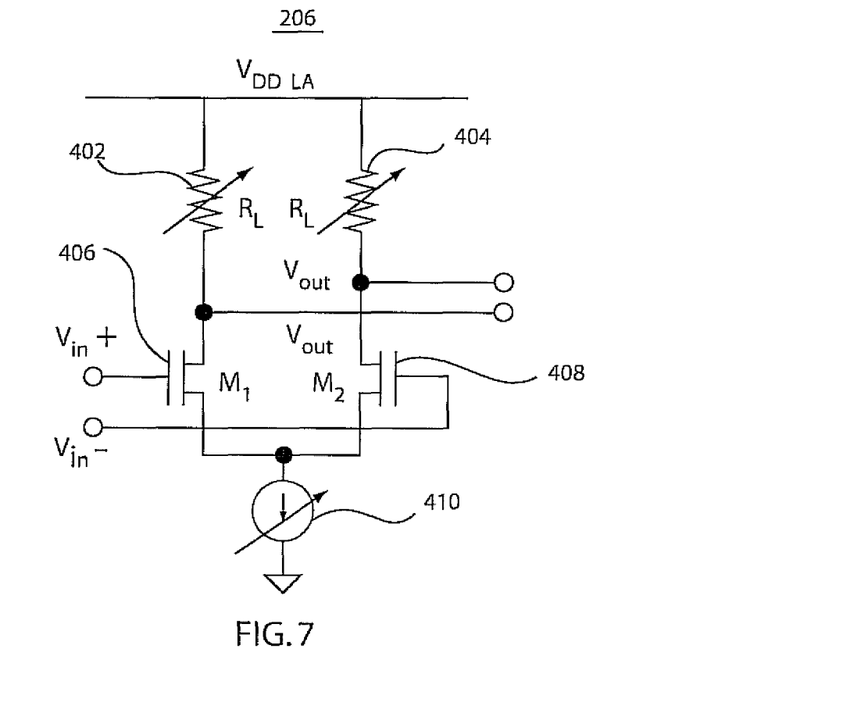
FIG. 7 is a diagram of an exemplary amplifier embodiment having an adjustable load and an adjustable current bias.

With reference now to FIG. 7 with continuing reference to FIGS. 5 and 6, an exemplary limiting amplifier embodiment 206 is illustrated. Here, the limiting amplifier 206 has a programmable gain, which the control logic 218 or 318 can manage, as described above, and can be implemented in an adaptive power efficient receiver architecture for multi-channel optical I/O links. In particular, the control logic 218 or 318 can control a programmable, variable bias current and/or a variable voltage load on the amplifier 206. For example, the limiting amplifier 206 can be powered by a voltage of $V_{DD\_LA}$ and can include first and second resistors 402 and 404 as shown in FIG. 7. In addition, the limiting amplifier 206 can further include first and second transistors 406 and 408, where the gates of the transistors are respectively coupled to the positive and negative components of the input voltage $V_{in}$ provided by the TIA 204. In addition, a programmable bias current 410 can be applied to adjust the gain on the LA, as described above. An integrated or shared control logic 218 or 318, with the assistance of one or more monitors 216, can implement the adaptive gain by controlling one or both of the bias current (I) and the resistors (R), which can increase or decrease the gain and voltage load, respectively, to reduce the power consumption based on input signal strength and/or a signal quality parameter, as described above. It should be noted that the bandwidth of the LA(s) 206 can be adjusted by adjusting the gain and/or voltage accordingly, as is known in the art.

Alternatively or additionally, in certain cases when the signal is strong, the control logic 218 or 318 can direct the bypass or reconnection of one or more programmable stages of the PA, permitting even greater power savings. For example, referring to FIG. 8, with continuing reference to FIGS. 5-7, the limiting amplifier 206, can be configured such that the voltage signal received from the TIA 204 is processed in stages through a plurality of amplifiers, which can be denoted as the amplifiers 414-418 in FIG. 8, each of which is operable through a switch 412. Thus, the control logic 218 or 318 on a corresponding chip can implement the bypassing or connection of the amplifiers 414-418 by controlling respective switches 412 to eliminate or connect stages of the LA. Alternatively, control logic 218 or 318 can be external to the corresponding chip and can perform the bypassing or connection of the amplifiers 414-418. In addition, the amplifiers 414-418 can be different or can be identical. For example, the current bias and/or the voltage load on the amplifiers may vary, based on design choice. Here, the control logic 218 or 318 can add or connect stages to increase the gain and can remove or bypass stages to decrease the gain accordingly based on the input signal strength and/or the signal quality parameter, as described above.

Figure 8:
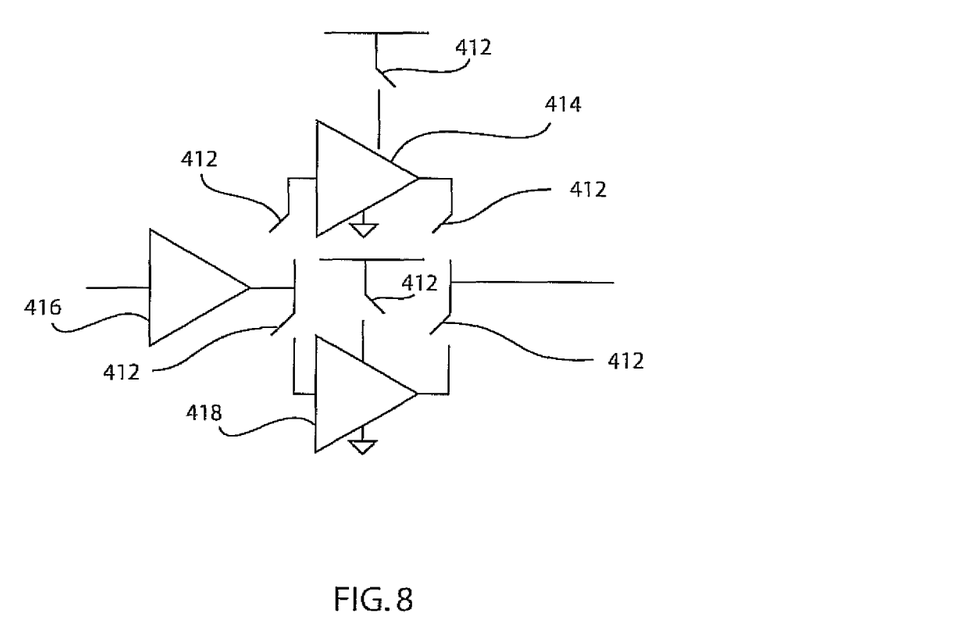
FIG. 8 is a diagram of an exemplary amplifier embodiment that is configured as multiple stages of amplifiers.

It should also be noted that the control logic 218 or 318 can bypass or reconnect stages to decrease or increase the bandwidth of the amplifier 206. For example, the current bias and/or the voltage load can vary across the amplifiers 414-418 such that removal or addition of stages can adjust the operating bandwidth or ranges of voltages that the LA 206 can process.

Thus, the control logic 218 or 318 can implement gain and/or bandwidth adjustment described above with respect to Plot 150 by controlling the bypass or connection of stages of the amplifier 206 in discrete steps based on monitored signal strength and/or monitored signal quality. Further, the control logic 218 or 318 can implement gain and/or bandwidth adjustment using the bypasses or reconnections alone or using a combination of the bypasses/connections and the adjustment of load and/or current bias described above. For example, the control logic 218 and 318 may adjust the load and/or the current bias, as described above with respect to FIG. 7, in one or more of the amplifiers 414-418 that the voltage signal does not bypass.

It should also be noted that, in addition to or in the alternative to the LA(s) 206, control logic 218 or 318 can adjust a gain and/or bandwidth for the TIA 204 in the same manners described above with regard to the LA(s) 206. For example, the TIA 204 can have a programmable gain such that current source provided by the photo diode 102 can be biased to adjust the gain and/or bandwidth for the TIA 204. Here, the monitor 216 can monitor the signal strength and/or the signal quality parameter to permit the control logic 218 or 318 to adjust the gain on the TIA 204 in accordance with the signal strength and/or the signal quality parameter, as described above. In addition, the monitor 216 can optionally be configured to monitor the current between the photo diode 102 and the TIA 104. Further, TIA 204 can also be implemented in programmable stages. For example, the amplifiers 414-418 can denote TIA stages. Here, the control logic 218 or 318 can adjust the gain and/or the bandwidth of the TIA 204 by controlling the bypass or connection of stages of the amplifiers 414-418 in discrete steps based on monitored signal strength and/or monitored signal quality as described above with regard to FIG. 8. Moreover, as discussed above with regard to the LA(s) 206, the control logic 218 or 318 can implement gain and/or bandwidth adjustment of the TIA 204 using the bypasses/connection of stages alone or using a combination of the bypasses/connection of stages and the adjustment of load and/or current bias on the TIA 204 described above. As such, in accordance with exemplary embodiments, one or both of the LA(s) 206 and the TIA 204 can have a programmable gain and/or programmable stages that can be adjusted by the control logic 218 and 318 to optimize the power consumption of an optical receiver.

Figure 9:
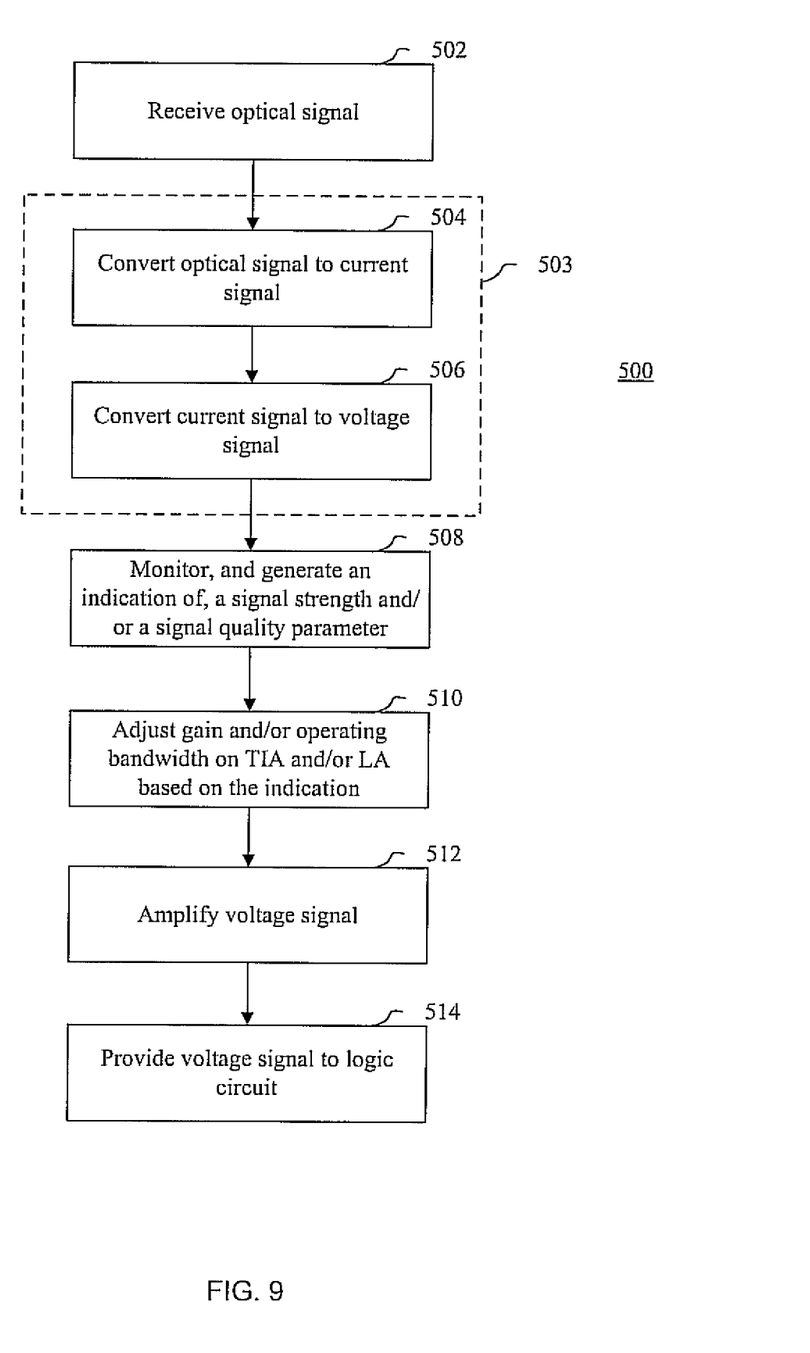
FIG. 9 is a flow diagram of an exemplary method embodiment for processing an optical signal.

With reference now to FIG. 9, with continuing reference to FIGS. 1, 2 and 5-8, an exemplary method embodiment 500 for processing an optical signal is illustrated. It should be understood that all aspects described above with regard to circuit/system embodiments 200 and 300 can be implemented within the method 500.

The method 500 can begin at step 502 in which the optical receiver 200 or 300 can receive an optical signal, as described above.

At step 503, the optical receiver 200 or 300 can convert the optical signal to a voltage signal. For example, the optical receiver 200 or 300 can implement step 503 by performing two conversion steps. For example, at step 504, the photo diode 102 can convert the received optical signal to a current signal, as described above. In addition, at step 506, the transimpedance amplifier 204 can convert the current signal to a voltage signal, as described above. In certain embodiments, as illustrated in FIG. 5, the photo diode and the TIA 204 can form a conversion module 203 that can perform step 503.

At step 508, the monitor 216 can monitor, and generate an indication of, at least one of a signal strength or a signal quality parameter, as described above. For example, the monitor 216 can monitor the voltage signals between the TIA 204 and the LA(s) 206, as described above. Alternatively, the monitor 216 can monitor the current signals between the PD 102 and the TIA 204, as described above. In either case, the monitored signals can indicate the signal strength of the received optical signal and/or can indicate a signal quality parameter of the received optical signal. For example, as stated above, the output of the TIA 204 can scale proportionally with the input optical signal. The signal quality parameter can be a signal quality, a bit error rate, a packet integrity, an eye opening parameter or any combination of quality parameters. In addition, the monitor 216 can also measure other indications of the signal quality. Further, the monitor 216 can provide the indication of the signal strength and/or the signal quality parameter to the controller 218 or 318 to permit the controller to adjust the gain and/or the bandwidth on the TIA 204 and/or the LA(s) 206, as described above.

At step 510, the controller 218 or 318 can adjust the gain and/or operating bandwidth on the TIA 204 and/or LA 106 based on the indication of the signal strength and/or the signal quality parameter to reduce power consumption of an optical receiver, as discussed above. For example, as described above, the controller 218 or 318 can adjust the gain and/or the bandwidth on the TIA 204 and/or LA 206 in accordance with Plot 150 of FIG. 2 based on the input optical signal strength and/or the signal quality parameter, as described above. In addition, the controller 218 or 318 can adjust the gain and/or bandwidth in a variety of ways. For example, the controller 218 or 318 can adjust the gain and/or the bandwidth on the TIA 204 and/or the LA 206 by adjusting one or more of a voltage load or a bias current, as described above with respect to FIG. 7. Moreover, as discussed above with respect to FIG. 8, the TIA 204 (or the conversion module 203) and/or the LA 206 can be configured as a plurality of stages 414-418 of amplifiers. Here, the controller 218 or 318 can adjust the gain and/or bandwidth on the TIA 204 and/or the LA 206 by bypassing or connecting/adding at least a subset of the stages 414-418 via switches 412, as described above Further, the controller 218 or 318 can adjust the gain and/or bandwidth on the TIA 204 and/or the LA 206 in discrete steps corresponding to activated stages, as discussed above. For example, the TIA 204 and/or the LA 206 can implement the adjusted gain and/or bandwidth in discrete steps, where each activated stage performs a discrete gain and/or bandwidth adjustment. Activated stages can correspond to the stages that the voltage signal does not bypass. Additionally, the controller 218 or 318 can adjust the gain and/or bandwidth on the TIA 204 and/or the LA 206 by adjusting a voltage load and/or a bias current on one or more of the activated stages.

At step 512, the limiting amplifier 206 can amplify the voltage signal in accordance with an adjusted gain and/or an adjusted bandwidth, as described above. For example, the amplifier 206 can receive the voltage signal from the TIA 204 and can amplify the voltage signal in accordance with the adjustment of step 510 such that it is within an operable range of the logic component 114 or 315, as discussed above.

At step 514, the limiting amplifier 206 can provide the voltage signal to the logic circuit 114 or 315, as described above. For example, the limiting amplifier can provide the voltage signal to the logic circuit 114 or 315 directly or can provide the voltage signal to the logic circuit 114 or 315 via a transmission line 110 and an electrical receiver 112, as described above.

It should be understood that the method 900 can be implemented for each channel in the multi-channel architecture described above with respect to FIG. 6. As such, the controller 218 or 318 can adjust the gain and/or the operating bandwidth on a plurality of components corresponding to different channels in a multi-channel receiver architecture. For example, as stated above, controller 218 or 318 can adjust the gain and/or the operating bandwidth on any one or more of the TIA 204 and/or the LA 206 in any of the sets of processing components dedicated to channels 1-N in the circuit/system 300. It should also be understood that exemplary embodiments can include a computer readable storage medium comprising a computer readable program, where the computer readable program when executed on a computer causes the computer to perform steps of method 900. For example, the computer can perform the monitoring 508 and adjustment 510 steps of method 900.

Having described preferred embodiments of systems and methods implementing adaptive power efficient receiver architectures (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is clamed is:

1. A method for processing an optical signal comprising:
converting the optical signal to a voltage signal;
amplifying the voltage signal;
monitoring, and generating an indication of, at least one of a signal strength or a signal quality parameter; and
adjusting at least one of a gain or an operating bandwidth on at least one of the converting or the amplifying by deactivating, based on the indication and while receiving the optical signal, at least one amplifying element that implements at least one of the converting or the amplifying to reduce power consumption of an optical receiver, wherein the adjusting maintains signal linearity of the voltage signal.

2. The method of claim 1, wherein the adjusting at least one of the gain or the operating bandwidth further comprises adjusting a voltage load.

3. The method of claim 1, wherein the adjusting at least one of the gain or the operating bandwidth further comprises adjusting a bias current.

4. The method of claim 1, wherein the adjusting at least one of the gain or the operating bandwidth further comprises bypassing or adding stages of the converting or the amplifying.

5. The method of claim 4, wherein the adjusting further comprises adjusting at least one of the gain or the operating bandwidth in discrete steps corresponding to activated stages.

6. The method of claim 5, wherein the adjusting at least one of the gain or the operating bandwidth further comprises adjusting at least one of a voltage load or a bias current on at least one of the stages.

7. The method of claim 1, wherein the signal quality parameter is based on at least one of a signal quality, a bit error rate, a packet integrity or an eye opening parameter.

8. The method of claim 1, wherein the adjusting further comprises adjusting at least one of a gain or an operating bandwidth for a plurality of different channels.

9. A computer readable storage medium comprising a computer readable program, wherein the computer readable program when executed on a computer causes the computer to:
monitor, and generate an indication of, at least one of an optical signal strength or an optical signal quality parameter; and
adjusting at least one of a gain or an operating bandwidth on at least one of a trans-impedance amplifier or a limiting amplifier by deactivating, based on the indication and while receiving the optical signal, at least one amplifying element that implements at least one of the trans-impedance amplifier or the limiting amplifier to reduce power consumption of an optical receiver, wherein the adjusting maintains signal linearity of a signal processed by the trans-impedance amplifier or the limiting amplifier.

10. A receiver system for processing an optical signal comprising:
a conversion module configured to convert the optical signal to a voltage signal;
an amplifier configured to amplify the voltage signal such that the voltage signal is within an operable range of a digital logic component;
a monitor configured to monitor, and generate an indication of, at least one of a signal strength or a signal quality parameter; and
a controller configured to perform an adjustment of at least one of a gain or an operating bandwidth on at least one of the conversion module or the amplifier by deactivating, based on the indication and while receiving the optical signal, at least one amplifying element that implements at least one of the conversion module or the amplifier to reduce power consumption of the receiver system, wherein the adjustment maintains signal linearity of the voltage signal.

11. The system of claim 10, wherein the controller is further configured to adjust at least one of the gain or the operating bandwidth by adjusting a voltage load on at least one of the conversion module or the amplifier.

12. The system of claim 10, wherein the controller is further configured to adjust at least one of the gain or the operating bandwidth by adjusting a bias current on at least one of the conversion module or the amplifier.

13. The system of claim 10, wherein at least one of the conversion module or the amplifier is configured as a plurality of stages and wherein the controller is further configured to adjust at least one of the gain or the operating bandwidth by bypassing or connecting at least a subset of the stages.

14. The system of claim 13, wherein the controller is further configured to adjust at least one of the gain or the operating bandwidth in discrete steps corresponding to activated stages.

15. The system of claim 14, wherein the controller is further configured to adjust at least one of the gain or the operating bandwidth by adjusting at least one of a voltage load or a bias current on at least one of the stages.

16. The system of claim 10, wherein the signal quality parameter is based on at least one of a signal quality, a bit error rate, a packet integrity or an eye opening parameter.

17. The system of claim 10, wherein the controller is further configured to adjust at least one of a gain or an operating bandwidth on a plurality of components corresponding to different channels in a multi-channel receiver architecture.

18. A receiver device for processing an optical signal comprising:
a photo diode configured to convert the optical signal to a current signal;
a trans-impedance amplifier operatively coupled to the photo diode and configured to convert the current signal to a voltage signal;
a limiting amplifier operatively coupled to the trans-impedance amplifier and configured to amplify the voltage signal such that the voltage signal is within an operable range of a digital logic component;

a monitor configured to monitor, and generate an indication of, at least one of a signal strength or a signal quality parameter; and a controller configured to perform an adjustment of at least one of a gain or an operating bandwidth on at least one of the trans-impedance amplifier or the limiting amplifier by deactivating, based on the indication and while receiving the optical signal, at least one amplifying element that implements at least one of the trans-impedance amplifier or the limiting amplifier to reduce power consumption of the receiver device, wherein the adjustment maintains signal linearity of at least one of the current signal or the voltage signal.

19. The receiver device of claim 18, wherein the controller is further configured to adjust at least one of the gain or the operating bandwidth by adjusting a voltage load on at least one of the trans-impedance amplifier or the limiting amplifier.

20. The receiver device of claim 18, wherein the controller is further configured to adjust at least one of the gain or the operating bandwidth by adjusting a bias current on at least one of the trans-impedance amplifier or the limiting amplifier.

21. The receiver device of claim 18, wherein at least one of the trans-impedance amplifier or the limiting amplifier is configured as a plurality of stages of amplifiers and wherein the controller is further configured to adjust at least one of the gain or the operating bandwidth by bypassing or connecting at least a subset of the stages via switches.

22. The receiver device of claim 21, wherein the controller is further configured to adjust at least one of the gain or the operating bandwidth in discrete steps corresponding to activated stages.

23. The receiver device of claim 22, wherein the controller is further configured to adjust at least one of the gain or the operating bandwidth by adjusting a voltage load or a bias current on at least one of the stages.

24. The receiver device of claim 18, wherein the signal quality parameter is based on at least one of a signal quality, a bit error rate, a packet integrity or an eye opening parameter.

25. The receiver device of claim 18, wherein the controller is further configured to adjust at least one of a gain or an operating bandwidth on a plurality of components corresponding to different channels in a multi-channel receiver architecture.

* * * * *